United States Patent
Tannas, Jr.

(10) Patent No.: US 8,864,541 B2
(45) Date of Patent: Oct. 21, 2014

(54) APPARATUS AND METHODS FOR RESEALING RESIZED ELECTRONIC DISPLAYS

(71) Applicant: Lawrence E. Tannas, Jr., Orange, CA (US)

(72) Inventor: Lawrence E. Tannas, Jr., Orange, CA (US)

(*) Notice: Subject to any disclaimer, the term of this patent is extended or adjusted under 35 U.S.C. 154(b) by 0 days.

(21) Appl. No.: 13/669,379

(22) Filed: Nov. 5, 2012

(65) Prior Publication Data

US 2013/0115845 A1   May 9, 2013

Related U.S. Application Data

(60) Provisional application No. 61/556,150, filed on Nov. 4, 2011, provisional application No. 61/557,287, filed on Nov. 8, 2011.

(51) Int. Cl.
*H01J 9/20* (2006.01)
*G02F 1/1339* (2006.01)

(52) U.S. Cl.
CPC .................................... *G02F 1/1339* (2013.01)
USPC ............................. 445/25; 349/187; 349/190

(58) Field of Classification Search
CPC ...................................................... G02F 1/1339
USPC ............................... 445/24–25; 349/187–190
See application file for complete search history.

(56) References Cited

U.S. PATENT DOCUMENTS

| | | | |
|---|---|---|---|
| 4,275,494 A | 6/1981 | Kohyama et al. | |
| 4,743,099 A | 5/1988 | Dickerson et al. | |
| 5,164,565 A | 11/1992 | Addiego et al. | |
| 5,169,693 A | 12/1992 | Fujimura | |
| 5,278,685 A | 1/1994 | Iwamoto et al. | |
| 5,610,742 A * | 3/1997 | Hinata et al. | 349/122 |
| 5,757,456 A | 5/1998 | Yamazaki et al. | |
| 5,781,258 A | 7/1998 | Dabral et al. | |
| 5,808,719 A | 9/1998 | Fujiwara et al. | |

(Continued)

FOREIGN PATENT DOCUMENTS

| | | |
|---|---|---|
| EP | 0556855 | 8/1993 |
| GB | 2183073 | 5/1987 |

(Continued)

OTHER PUBLICATIONS

PCT International Search Report and Written Opinion for PCT/US2011/031989, Applicant: Lawrence E. Tannas, Jr., Forms PCT/ISA/210, PCT/ISA/220 and PCT/ISA/237, dated Nov. 28, 2011, 10 pages.

*Primary Examiner* — Elmito Breval
(74) *Attorney, Agent, or Firm* — William A. English; Vista IP Law Group LLP

(57) ABSTRACT

Pre-manufactured electronic displays and, in particular, liquid crystal flat-panel displays, may be cut to a new size and resealed while preserving their originally-manufactured properties. A display may be cut, and the exposed edge of a target portion may be sealed, e.g., to preserve the integrity of the target portion of the display. It may be desirable to cause a sealant to go in between the plates of the panel, e.g., to achieve improved yield, chemical isolation, dimensional integrity, and/or strength of the seal. Apparatus and methods are disclosed where the sealant is injected or otherwise forced into the region between the plates adjacent the exposed edge. This sealing process may achieve more sealant surface contact area inside the panel in between the plates, e.g., to achieve better bonding strength, chemical isolation, and/or improved yield.

18 Claims, 6 Drawing Sheets

(56) References Cited

U.S. PATENT DOCUMENTS

| | | |
|---|---|---|
| 5,812,226 A | 9/1998 | Izumi et al. |
| 5,851,411 A | 12/1998 | An et al. |
| 5,929,961 A | 7/1999 | Nishi et al. |
| 6,099,672 A | 8/2000 | Yamazaki et al. |
| 6,137,559 A | 10/2000 | Tanaka et al. |
| 6,191,840 B1 | 2/2001 | Bon |
| 6,204,906 B1 | 3/2001 | Tannas |
| 6,236,446 B1 | 5/2001 | Izumi et al. |
| 6,476,415 B1 | 11/2002 | Walker et al. |
| 6,509,949 B1 | 1/2003 | Lu et al. |
| 6,825,910 B2 * | 11/2004 | Aoki et al. ............ 349/190 |
| 7,256,862 B2 | 8/2007 | Chen et al. |
| 7,595,857 B2 | 9/2009 | Yang et al. |
| 7,780,492 B2 | 8/2010 | Tannas |
| 7,938,051 B2 | 5/2011 | Tannas |
| 2002/0018175 A1 | 2/2002 | Hong et al. |
| 2002/0033926 A1 | 3/2002 | Nakahara et al. |
| 2002/0044253 A1 | 4/2002 | Masuda et al. |
| 2002/0118335 A1 * | 8/2002 | Tannas, Jr. ............ 349/187 |
| 2003/0184706 A1 | 10/2003 | Watson |
| 2004/0074366 A1 | 4/2004 | Choo et al. |
| 2004/0263761 A1 * | 12/2004 | Tannas, Jr. ............ 349/153 |
| 2005/0001974 A1 | 1/2005 | Iida et al. |
| 2005/0056127 A1 | 3/2005 | Yamabuchi et al. |

FOREIGN PATENT DOCUMENTS

| | | |
|---|---|---|
| GB | 2330423 | 4/1999 |
| GB | 2381080 | 4/2003 |
| JP | 55026516 | 8/1978 |
| JP | 55084918 | 6/1980 |
| JP | 57099615 | 6/1982 |
| JP | 59017532 | 1/1984 |
| JP | 60146228 | 8/1985 |
| JP | 61186941 | 8/1986 |
| JP | 61210326 | 9/1986 |
| JP | 61215524 | 9/1986 |
| JP | 2235026 | 9/1990 |
| JP | 3293633 | 12/1991 |
| JP | 5-045617 | 2/1993 |
| JP | 6-130403 | 5/1994 |
| JP | 08076074 | 3/1996 |
| JP | 08122769 | 5/1996 |
| JP | 08146444 | 6/1996 |
| JP | 9197416 | 7/1997 |
| WO | 9919765 | 4/1999 |
| WO | 03040049 | 5/2003 |

* cited by examiner

APPARATUS AND METHODS FOR RESEALING RESIZED ELECTRONIC DISPLAYS

RELATED APPLICATION DATA

The present application claims benefit of co-pending provisional application Ser. No. 61/556,150, filed Nov. 4, 2011, and 61/557,287, filed Nov. 8, 2011. The entire disclosures of these references are expressly incorporated by reference herein.

FIELD OF THE INVENTION

The present application is related to apparatus and methods for resizing liquid crystal displays (LCDs) or other electronic displays, and, more particularly, for resealing a cut edge of a desired or target portion of a display separated from an excess portion.

BACKGROUND

It has been demonstrated that electronic displays can be resized to new dimensions. The display may be cut by mechanical scribing, sawing, laser scribing, water jet or by use of other techniques known in the art. The display is resealed by applying a sealant along the exposed and newly-cut edge. The sealant may be applied along the cut edge in a way sufficient to seal the image-generating medium in between the plates, to structurally bond the plates together while preserving the dimensional characteristics required of the electronic display, and/or to obtain structural strength. Additionally, the sealant should maintain the cell structure with sufficient bonding strength to survive the environment to which the display will be exposed.

For example, it has been proposed to apply a bead of sealant along the cut edge and cure the sealant in place. To enhance the strength, the sealant may be distributed into and between the plates, e.g., as disclosed in U.S. Pat. Nos. 6,204,906 and 7,780,492. Such processes may cause the sealant to penetrate the region between the plates, e.g., by selecting an appropriate sealant viscosity and/or other properties. For example, such techniques may involve squeezing the plates together, applying a bead of sealant, and releasing pressure on the plates. A slight negative pressure may occur, which draws the sealant between the plates. However, this may not yield a desired amount of sealant between the plates.

Therefore, apparatus and methods for sealing the cut edge of displays being resized would be useful.

SUMMARY

The present application is directed to apparatus and methods for resizing liquid crystal displays (LCDs) or other electronic displays, and, more particularly, for resealing a cut edge of a desired or target portion of a display separated from an excess portion.

An electronic display generally includes two plates, front and back, holding drive electronics on the edges and throughout the area of the display image. The plates are typically glass or plastic and may have polarizers, filters, image enhancement films, and/or viewing angle enhancement films attached thereto. Picture element electrodes are distributed throughout the display image area to control the image-generating medium. A perimeter seal holds the plates together while isolating and protecting the image-generating medium from the outside environment and/or maintaining mechanical alignment.

If desired, a display may be cut through the original seal, electronics, and image-generating medium in order to create a new and smaller resized target display portion and an excess or waste portion. For example, a display may be cut, e.g., through the original display area (including picture elements and associated electronics) to generate a target portion to be preserved and resealed as well as a waste portion (both of which will include some of the original picture elements and associated electronics). The seal integrity should be reestablished on the target portion to provide a usable resized display. To reestablish the seal, an adhesive or other sealant may be injected between the plates by methods described herein.

In accordance with a first exemplary embodiment, the sealant may be caused to flow in between the plates by using a tool, e.g., a roller, trowel, and the like, to forcefully push the sealant in between the plates. The sealant may be pushed between the plates as far as necessary and/or desired to establish a desired bonding strength. Optionally, some image-generating medium may be moved or removed in order to provide space for the sealant.

Care should be taken to ensure achievement of desired mechanical attributes. For example, with a liquid crystal electronic display, the spacing (i.e., the distance between the plates or the "cell gap") should be substantially preserved within desired tolerances and/or the mechanical properties of the sealant should be sufficient to maintain proper spacing between the plates along the resealed edge. Optionally, a pressure-plate fixture may be used to hold the target portion of the electronic display and/or control the spacing of the plates while the sealant is being applied. Mechanical force may then be applied to a bead of sealant placed on the cut line to direct the sealant between the display plates, potentially farther than could be achieved otherwise. If desired, in concert with injection of the sealant, the target display plates may be manipulated with the pressure-plate fixture., e.g., to enhance penetration of the sealant.

In accordance with another embodiment, a fixture may be placed on the cut and exposed edge of the target portion to inject sealant at least partially into the region between the plates. Such an injection process may facilitate sealing resized displays, such as those including fixed pillars for spacers. In addition or alternatively, an exposed edge of a target portion may be sealed with sealant injected between the plates using a vacuum method, e.g., using a pressure chamber, as described herein.

Exemplary embodiments of LCDs that include first and second sets of pillars and may be resized according to the methods described herein are disclosed in U.S. Pat. No. 7,557,895, the entire disclosure of which is expressly incorporated by reference herein. The first, higher pillar spacers may be compressed by atmospheric pressure with the liquid crystal material within the display, and the second, shorter pillar spacers may inhibit further compression. Thus, a "squeeze and release" sealing method, such as the methods disclosed in U.S. Pat. No. 7,780,492, may not remove sufficient liquid crystal material when the display is compressed, and/or may not draw sufficient sealant inwardly in between the plates along the exposed edge when the compression is released.

In accordance with still another embodiment, for this and similarly constructed displays, it may be desirable to subject the complete panel to a vacuum to create the seal. For example, the exposed edge may be covered by sealant as the edge is drawn down in a vacuum. Due to the net negative pressure on the outer surfaces of the plates, the plates may expand slightly away from one another and draw sealant into the region between the plates along the exposed edge. The sealant may then be cured while the display is maintained in the vacuum state.

If desired, steps may be taken to control the size of the cell gap at the exposed edge as the sealant is cured. For example, the plates of the display may be mechanically compressed towards one another along the exposed edge being sealed, while other regions of the plates may separate slightly. When the display is returned to atmospheric pressure, the entire area of the plates may resiliently and/or automatically return to the proper spacing as a consequence of the internal pillar spacers. Optionally, spacer beads may be used in the sealant to enhance the desired cell gap along the sealed edge.

In accordance with yet another exemplary embodiment, sealant may be applied as a bead along the exposed edge while the display is held in a substantially vertical position, i.e., with the exposed edge above the rest of the display. Alternatively, the display may be held in a substantially vertical position with the exposed cut edge down and emerged in a trough full of sealant, similar to other embodiments herein. In either case, the compressed pillars may be used in compression to control spacing, which may cause the plates to expand slightly and draw the sealant in between the plates.

Other forces may also be used to draw the sealant inwardly between the plates along the exposed edge when the entire panel is subjected to a vacuum. For example, the sealant may be pressurized (relative to the outer surfaces of the plates and/or the interior of the display) to push the sealant between the plates when the plates are subjected to a vacuum. Optionally, the plates may be clamped along the exposed edge to control the cell gap spacing and separate the pressure zones.

Optionally, in any of the embodiments herein, a detectable trace material, e.g., a phosphorescent or fluorescent material, may be provided in the sealant to facilitate monitoring application of the sealant. For example, an appropriate light source may be placed adjacent an exposed edge being sealed to illuminate the trace material. The depth of penetration of the sealant between the plates may then be monitored based on observation of the trace material through the display. When a desired depth of penetration is obtained, the sealant may be cured and/or the vacuum or other forces being used to apply the sealant may be removed. Exemplary adhesives having phosphorescent or fluorescent material in them for confirming the location of the adhesive may be available under the registered brand name LOCTITE®.

In accordance with one embodiment, a method is provided for changing the physical size and/or shape of an electronic display, wherein the display comprises a front plate, a back plate, and a perimeter seal, and wherein an image-generating medium is sealed in a region between the plates, and wherein electronic circuits are distributed throughout an original image area of the display. Initially, the display may be cut along desired dimensions resulting in a target display portion and an excess display portion thereby breaking the perimeter seal of the display and creating an exposed edge. Sealant may be applied along the exposed edge; and a roller may be rolled or otherwise applied along the exposed edge to force sealant into the region between the plates adjacent the exposed edge.

If desired, additional sealant may be applied along the exposed edge after rolling the roller along the exposed edge, and the roller may be rolled along the exposed edge to force additional sealant into the region between the plates adjacent the exposed edge.

In accordance with another embodiment, a method is provided for changing the physical size and/or shape of an electronic display, wherein the display comprises a front plate, a back plate, and a perimeter seal, and wherein an image-generating medium is sealed in a region between the plates, and wherein electronic circuits are distributed throughout an original image area of the display. Initially, the display may be along desired dimensions resulting in a target display portion and an excess display portion thereby breaking the perimeter seal of the display and creating an exposed edge. The target display portion may be placed in a pressure fixture comprising first and second chambers, the first chamber comprising a trough of sealant, the cut edge of the target display portion immersed in the sealant, the second chamber communicating with the exterior surface of the plates of the target display portion. A pressure differential may be applied between the first and second chambers to force sealant from the trough into the region between the plates adjacent the cut edge. For example, one or more pressure sources may be activated for increasing the pressure of the second chamber relative to the first chamber to cause the sealant to be injected along the cut edge into the region between the plates.

In accordance with yet another embodiment, a method is provided for changing the physical size and/or shape of an electronic display, wherein the display comprises a front plate, a back plate, and a perimeter seal, and wherein an image-generating medium is sealed in a region between the plates, and wherein electronic circuits are distributed throughout an original image area of the display. Initially, the display may be cut along desired dimensions resulting in a target display portion and an excess display portion thereby breaking the perimeter seal of the display and creating an exposed edge. Sealant may be applied along the exposed edge such that the sealant penetrates into the region between the plates adjacent the exposed edge, and trace material within the sealant may be monitored to identify a depth of penetration of the sealant between the plates. For example, the trace material may include phosphorescent or fluorescent material and monitoring the trace material may include placing a light source adjacent the exposed edge to illuminate the trace material such that the phosphorescent or fluorescent material is visible to the naked eye.

In an exemplary embodiment, the sealant may be injected into the region between the plates adjacent the exposed edge, and the depth of penetration may be monitored to determine that the initial depth of penetration is less than a desired depth of penetration. In this instance, additional sealant may be applied between the plates along the exposed edge to increase the depth of penetration of the sealant.

In another exemplary embodiment, a bead of sealant may be applied along the exposed edge, and a roller may be rolled or otherwise applied along the exposed edge to force sealant into the region between the plates adjacent the exposed edge. In this instance, if the depth of penetration is less than a desired depth of penetration, additional sealant may be applied along the exposed edge, and the roller may be rolled along the exposed edge to force additional sealant into the region between the plates adjacent the exposed edge.

In accordance with still another embodiment, a method is provided for changing the physical size and/or shape of an electronic display, wherein the display comprises a front plate, a back plate, and a perimeter seal, and wherein an image-generating medium is sealed in a region between the plates, and wherein electronic circuits are distributed throughout an original image area of the display. Initially, the display may be cut along desired dimensions resulting in a target display portion and an excess display portion thereby breaking the perimeter seal of the display and creating an exposed edge. A fixture may be placed over at least a portion of the exposed edge; and sealant from a dispenser may be injected through the fixture onto the exposed edge such that the sealant penetrates into the region between the plates adjacent the exposed edge. For example, the sealant may partially penetrate into the region between the plates adjacent the exposed edge when the sealant is injected from the dispenser through the fixture, and a tool, such as a roller, may be used to force the sealant to penetrate further into the region between the plates adjacent the exposed edge.

In accordance with yet another embodiment, an assembly is provided that includes an electronic display comprising a front plate, a back plate, and a perimeter seal between the plates and extending around multiple edges of the display, an image-generating medium within a region between the plates, and an exposed edge along one side of the plates; a fixture comprising a slot sized to be received over the plates along the exposed edge, the fixture comprising a passage comprising an outlet communicating with the slot; and a dispenser comprising sealant within a housing and a nozzle configured to be coupled to the passage such that sealant within the housing is injectable through the nozzle into the slot of the fixture to deliver the sealant along the exposed edge of the display.

Other aspects and features of the present invention will become apparent from consideration of the following description taken in conjunction with the accompanying drawings.

BRIEF DESCRIPTION OF THE DRAWINGS

The drawings illustrate exemplary embodiments of the invention, in which.

DETAILED DESCRIPTION OF THE EXEMPLARY EMBODIMENTS

Figure 1A:
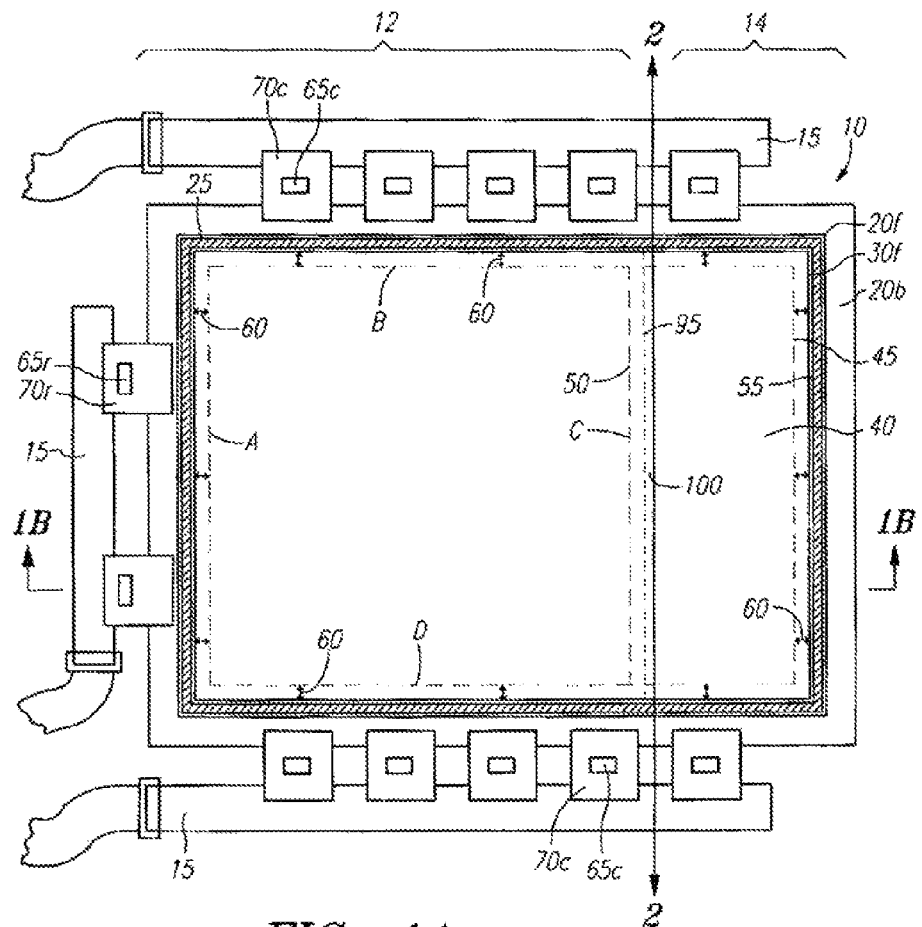
FIG. 1A is a plan view of a typical liquid crystal display ("LCD")
Figure 1B:
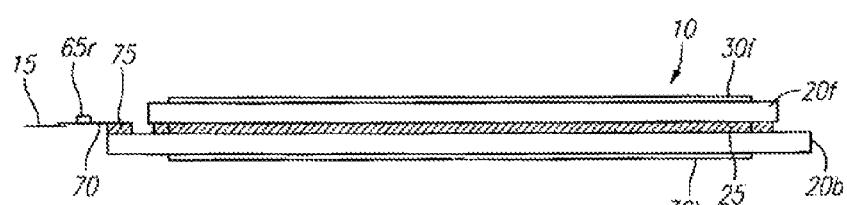
FIG. 1B is a cross-sectional view of the display of FIG. 1A, taken along line 1B-1B, with column TABs removed from the cross-section for purposes of clarity.

An electronic display may be resized by first cutting the display along desired dimensions resulting in a target display portion and a waste or excess portion using methods now known in the art. For example, turning to the drawings, FIGS. 1A and 1B show a typical non-square (rectangular) liquid crystal display ("LCD") 10, e.g., before resizing and/or other modification as described herein, but after disassembly from its original bezel, frame, and/or other associated hardware and electronics. For clarity, some of the external components associated with the display 10 (other than the circuit boards 15) are not shown, e.g., that may be bonded or otherwise attached to the plates 20. Such external components may be removed before or while customizing the display 10, as described elsewhere herein.

The display 10 generally includes a front plate 20f and a back plate 20b, e.g., made of glass, such as borosilicate or other hard glass. The plates 20 are held together by a perimeter seal 25, and may be further secured within a bezel (not shown), which, in turn, may be secured to a frame or other hardware (not shown), e.g., for attachment to the target location, e.g., in a cockpit panel of an aircraft, simulator, and the like. One or more polarizing films 30f and 30b, filters (not shown), image enhancement films (not shown), retardation films (not shown), viewing angle enhancement films (not shown), and/or other films may exist on the front and/or back outer surfaces of the plates 20.

Thus, each side of the display 10 generally includes two major layers, and possibly many minor layers. For example, the outer layer of each side may include a polarizer, e.g., made of plastic, along with several minor layers (e.g., filters, films, compensators, optical coatings, adhesives, etc.). As used herein, "polarizer" may be used generically to refer to the entire outer layer on each side of the display 10, even though the outer layer may include additional layers in addition to the polarizer (or even instead of a polarizer). The inner layer of each side of the display 10 may include a major layer, i.e., the glass plate, but may also include many minor layers (e.g., electrical circuitry, dielectrics, filters, etc., not shown) printed or otherwise provided on the plate 20, e.g., on an inner surface of the glass plate 20. As used herein, "plate" may be used generically to refer to the glass plate as well as the many minor layers carried by the glass plate.

With continued reference to FIG. 1A, the original display image area 40, e.g., defined by the manufacturer of the display 10, is indicated by dashed perimeter line 45. Dashed line 50 represents the desired right edge of an exemplary target display image area 40 after resizing, as described below. A light-blocking mask (not shown), e.g., an opaque coating, may be provided on at least one of the inner surfaces of the plates 20, e.g., covering a perimeter area around the display image area 40, and extending outwardly to a sufficient distance to serve its purpose. Typically, the distance may be up to the edge of the bezel, or to the inner edge 55 of perimeter seal 25, as indicated by arrows 60 in FIG. 1A. Without the mask, light escaping from the edge of the display image area 40 may distract a person viewing the display 10 and/or otherwise impair viewing an image on the display 10.

Row and column electronic drivers 65r and 65c respectively are bonded to TAB substrates 70r and 70c respectively, which in turn are bonded to the edges of the plates 20, e.g., using electrically-anisotropic adhesives known in the art. In avionics, bent TABs (not shown) may be used to save panel area. In addition or alternatively, the drivers 65 may be attached directly to the plates 20 as COGs. The TABs 70 may be bonded or soldered to circuit boards 15, and are electrically connected to external sources via connections 90 to circuit boards 15. COGs (not shown) may be electrically connected to the edges of the display plates 20, which may be electrically connected via ribbon cables to external sources (not shown).

Figure 2A:
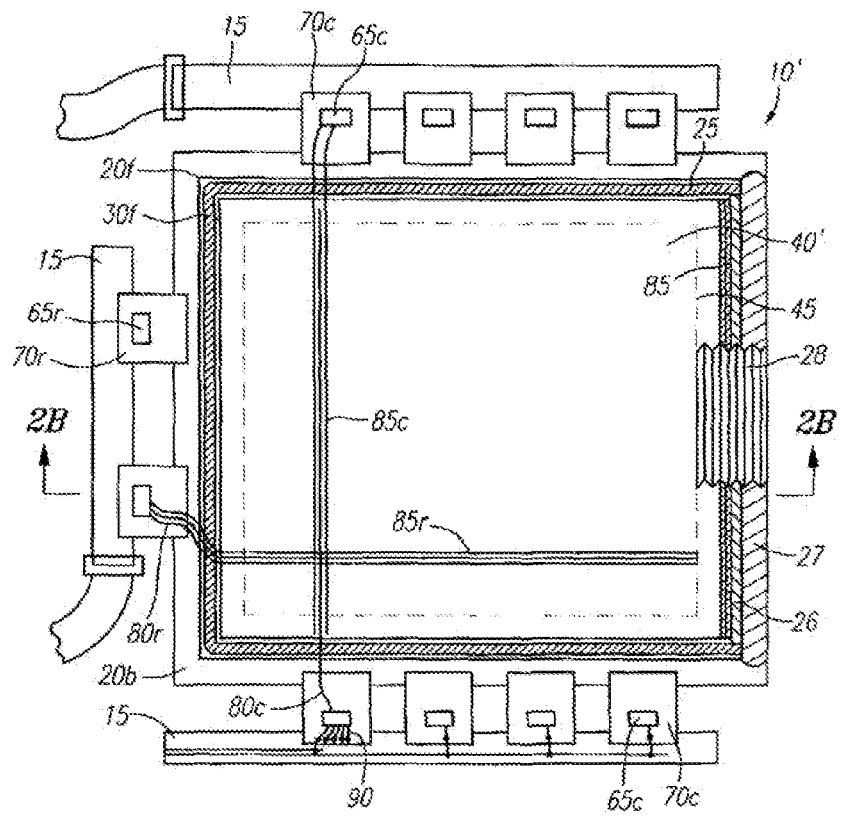
FIG. 2A is a plan view of a resized or customized display made from the display shown in FIG. 1A, by cutting along line 2-2 in FIG. 1, and then resealing a retained portion of the display.

For simplicity, a few exemplary connections 90 are shown in FIG. 2A, although it will be understood that they may be provided as desired or needed.

The electronic drivers 65 may include VLSI circuits having corresponding external leads 80r and 80c that are electrically connected through perimeter seal 25 to row and column electric leads 85r and 85c, respectively (see FIG. 2A). Again for simplicity, only a few leads 80r, 80c from one row TAB 70r and two column TABs 70c are shown in FIG. 2A, but it is understood that each row TAB 70r and each column TAB 70c may have dozens or even hundreds of individual leads 80. The row and column electric leads 85 may be distributed throughout an image-generating medium, such as liquid crystal material (normally transparent) contained between the plates 20, as seen in FIG. 2A.

In addition to holding the plates 20 together, the perimeter seal 25 substantially isolates and protects the image-generating medium from the outside environment. In addition, precisely sized spacers (not shown) may be distributed throughout the image-generating medium. After conventional manufacturing, the region between the plates 20 may be maintained at a partial vacuum to draw the plates 20 against the spacers, e.g., to ensure that the distance between the plates 20 is maintained at a predetermined cell spacing or "cell gap," e.g., between about five (5) and six (6) micrometers in the exemplary case of LCDs, which is appropriate for the display 10 to operate normally. It will be appreciated that the cell gap may be orders of magnitude smaller than the thickness of the plates 20, and that the relative dimensions of the cell gap and plates are shown simply to facilitate illustration and are not to scale. Although an active matrix LCD is generally described herein, it will be appreciated that the apparatus and methods herein may be used to customize or otherwise modify other electronic displays, such as passive matrix LCDs, plasma panels, organic LEDs, (OLEDs), and the like.

Initially, to resize a display, a cut line may be identified, such as cut-line 2-2 in FIG. 1A, which may separate a target portion 12 of the original display 10 (e.g., corresponding to the portion to be retained to create the customized display 10') from an excess or waste portion 14 (e.g., corresponding to the portion that may be discarded or saved for other purposes). In the example shown, the target portion 12 is substantially square, e.g., corresponding to a standard shape of a region of an airplane control panel (not shown). Alternatively, the target portion 12 may have a rectangular, triangular, curved, or other more complicated shape (e.g., which may include cutting one or more additional portions from the target portion 12, as described further elsewhere herein).

If not previously disassembled, the display 10 may be removed from its frame assembly, e.g., if a fully assembled display apparatus is being resized. This may include removing any excess electronics that may interfere with a portion of the resizing procedure, and/or that may be modified or replaced with other electronics.

One or more circuit boards, e.g., circuit boards 15 and/or TABs 70, of the display may be cut, e.g., using hand or power tools, such as a hand shear, power saw, and the like. As shown in FIGS. 1A and 2A, the circuit board 15 has been cut generally parallel to cut line 2-2. Optionally, any cut edges may be trimmed or otherwise treated, e.g., using a mill, router, sandpaper, and the like. If the cut-line 2-2 requires cutting through an electronic driver 65, the driver 65 may need to be relocated and/or replaced. Alternatively, the circuit board(s) 15, TABs 70, and/or drivers 65 may be removed entirely, e.g., if new flexible or rigid circuits boards are to be attached to the customized display 10.'

One or more polarizers (and/or other films) 30 may be removed from at least a portion of the display 10, e.g., on the exposed surfaces of one or both plates 20 of the display 10. For example, in one embodiment, the polarizer(s) 30 may be scored, e.g., inside the cut-line 2-2, to create a target polarizer portion overlying the target portion, which may be retained during the customization process. The remainder or excess polarizer portion (e.g., overlying the cut-line 2-2 and the excess portion 14 of the COTS display 10) may then be removed and/or discarded. In another embodiment, the polarizer(s) 30 may be scored along two lines on either side of the cut-line 2-2, and the resulting strip may be removed to provide access to the underlying plate(s) 20. In still another embodiment, a portion of the polarizer(s) 30 immediately overlying the cut-line 2-2 (or offset to either side of the cut-line 2-2, if desired) may be removed to create a narrow trench or channel (not shown) through the polarizer(s) 30 to the surface of the plate(s) 20, e.g., using a saw or other tool.

Using these methods, the original polarizer(s) 30 may remain intact over a target display image area 40' while still providing unobstructed access to the plates 20, e.g., for cutting or otherwise separating portions of the plates 20. Alternatively, the display 10 may not include any polarizers or films, and this step may be omitted.

For example, in FIG. 2A, the target display image area 40' of the target portion 12 is defined by a rectangle (or square) A-B-C-D, and the polarizer(s) 30 should remain intact at least over this area. In addition, the polarizer(s) 30 over the cut line 2-2 may be removed without substantial risk of damaging the surface of the plates 20, which may prevent or create problems scribing the surface of the plates 20.

Optionally, after the one or more polarizers are at least partially removed, the surface of the display 10 may be cleaned along the cut line 2-2. For example, any sawdust, remaining film adhesive, and/or other residue may be removed, e.g., to clear the exposed surface of the plate 20.

Figure 3:
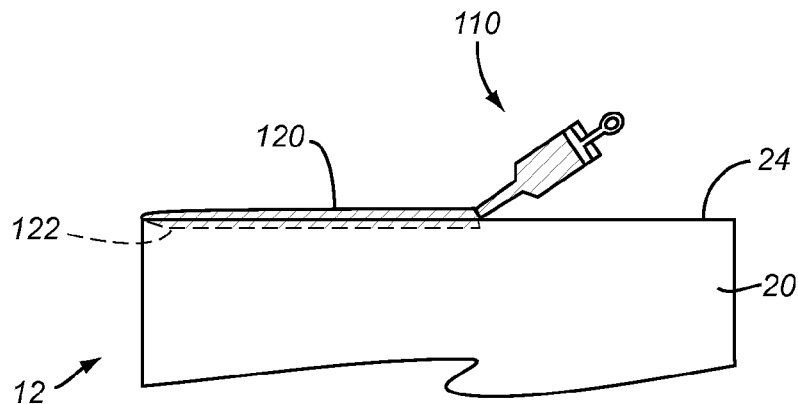
FIG. 3 shows a target portion that has been cut from a larger display to create a newly-cut edge, and a bead of sealant being applied to the newly-cut edge.
Figure 4:
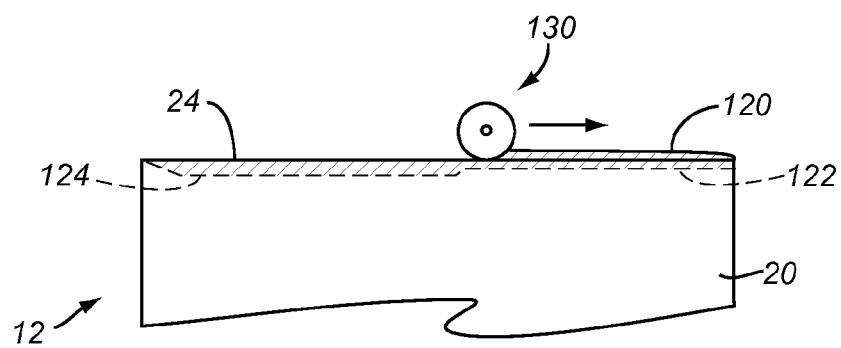
FIG. 4 shows a roller being used to inject or direct sealant in between the plates, e.g., from the bead shown in FIG. 3.

The plates may then be cut, e.g., along the cut line 2-2, to create a cut and/or exposed edge 24, e.g., as shown in FIGS. 3 and 4. For example, one or both plates 20 of the display 10 may be scribed along the intended cut line 2-2 (shown in FIG. 2A). The resulting vents may not separate the target portion 12 of the display 10 from the excess portion 14. Rather, the vents may form the beginning of a crack that may be propagated into the glass plates 20, as described further below. Thus, after removing the polarizer(s) and/or creating the vents 34, the display 10 may be handled or moved, if necessary, without risk of damaging the display 10 or LC material escaping from within the display 10 before separating the target and excess portions 12, 14.

For example, the display 10 may be placed on a flat plate of glass and the like (not shown). A strip of material, e.g., a 0.008 inch thick silicone or rubber strip (also not shown), may be placed on the flat plate before the display 10 such that the cut line 2-2 is substantially parallel to the rubber strip but offset to one side, e.g., about fifty (50) millimeters (two (2) inches). The cut line 2-2 of the upper plate may then be stroked with a cotton swab or other tool at moderate pressure, e.g., to cause the lower plate of the display 10 to break along the scribe line. The display 10 may be turned over, placed upon the flat plate over the rubber stripe and aligned in a similar manner, and the other plate (now exposed) may be stroked in a similar manner, to break the (now) lower plate along the scribe line. Thus, the display 10 may be separated into multiple pieces, e.g., into a target portion and an excess portion.

Further information regarding exemplary apparatus and methods for cutting displays are disclosed in U.S. Pat. Nos. 6,204,906, 7,780,492, and 7,938,051, the entire disclosures of which are expressly incorporated by reference herein. It will also be appreciated that other methods may be used for separating the target portion 12 from the excess portion 14, e.g., such as sawing partially or entirely through the plates, e.g., as disclosed in U.S. Pat. Nos. 7,002,660 and 7,161,651, the entire disclosures of which are expressly incorporated by reference herein.

The cut and exposed edge 24 of the plates 20 of the target display portion 12 may be sealed using any of the apparatus and methods described herein, e.g., to apply forces to inject sealant in between the plates. The sealant may be injected along the newly-cut seal line in parallel or in series. Fixtures and procedures are presented to inject the sealant simultaneously or sequentially into the "gap" of the newly-cut edge 24, i.e., the region between the plates 20 within the cut edge 24 of the plates 20. The sealant may flow into the gap between the plates, e.g., in the volume previously occupied by the image-generating medium and/or by displacing the image-generating medium.

The sealant should have a sufficiently low viscosity to flow in between the plates 20 when subjected to differential pressure and/or mechanical forces involved in the processes described herein. The image-generating medium may be moved from between the plates 20 to make room for the sealant. The image-generating medium may either be removed before sealant injection, or it may be pushed into the space between plates 20 as the sealant is being injected. For increased efficiency, optionally, the process may be applied to several target displays at the same time.

Turning to FIGS. 3 and 4, one method for applying sealant is to use a dispenser 110 to apply a bead 120 of sealant on the cut edge 24 of the plates 20 encompassing the open gap between the plates 20, e.g., as shown in FIG. 3. The resulting bead 120 may remain initially outside the region between the plates or the sealant may at least partially penetrate between the plates (e.g., more than three times the cell gap), as shown at 122 in FIG. 3. Optionally, additional penetration may be achieved if a fixture is used in conjunction with the dispenser, as described further elsewhere herein. For example, a penetration of more than three times the cell gap may enhance yield, improve chemical protection, and/or enhance seal integrity.

In an alternative embodiment, sealant may be deposited on the cut edge 24 by dipping the cut edge 24 in a trough of sealant (not shown). Further, the sealant may also be applied via a pre-cast ribbon, rope, or tape of sealant, e.g., as disclosed in U.S. Publication No. 2012/0140138, the entire disclosure of which is expressly incorporated by reference herein.

In one embodiment, as shown in FIG. 4, once the sealant is applied along the exposed edge 24, e.g., without fully and/or completely penetrating into the region between the plates 20, a roller 130 or other tool may be used. For example, with the target portion 12 mounted or otherwise retained in a vertical orientation, as shown, the roller 130 may be rolled back and forth along the cut edge 24, thereby pushing at least a portion of the bead 110 of sealant in between the plates 20, e.g., as shown at 124 in FIG. 4. The roller 130 may be positioned as it travels along the cut edge 24 and/or may pick up some sealant to redistribute the sealant along the cut edge 24. Optionally, the sealant may be directed further into the region between the plates 20 by repeatedly dispensing a bead 120 along the cut edge 24 and using the roller 130 to force each application of sealant material in between the plates 20.

Alternatively, the force may be applied by other tools, such as with the aid of a special fixture that transfers a drive force directly from the dispenser into the region between the plates 20, thus preventing the sealant from escaping substantially around the cut edge 24 of the plates 20. For example, turning to FIGS. 6A and 6B, an exemplary embodiment of a fixture 210 is disclosed that may be placed over and/or along the exposed edge 24 of the target portion 12 to facilitate applying the sealant.

Figure 6A:
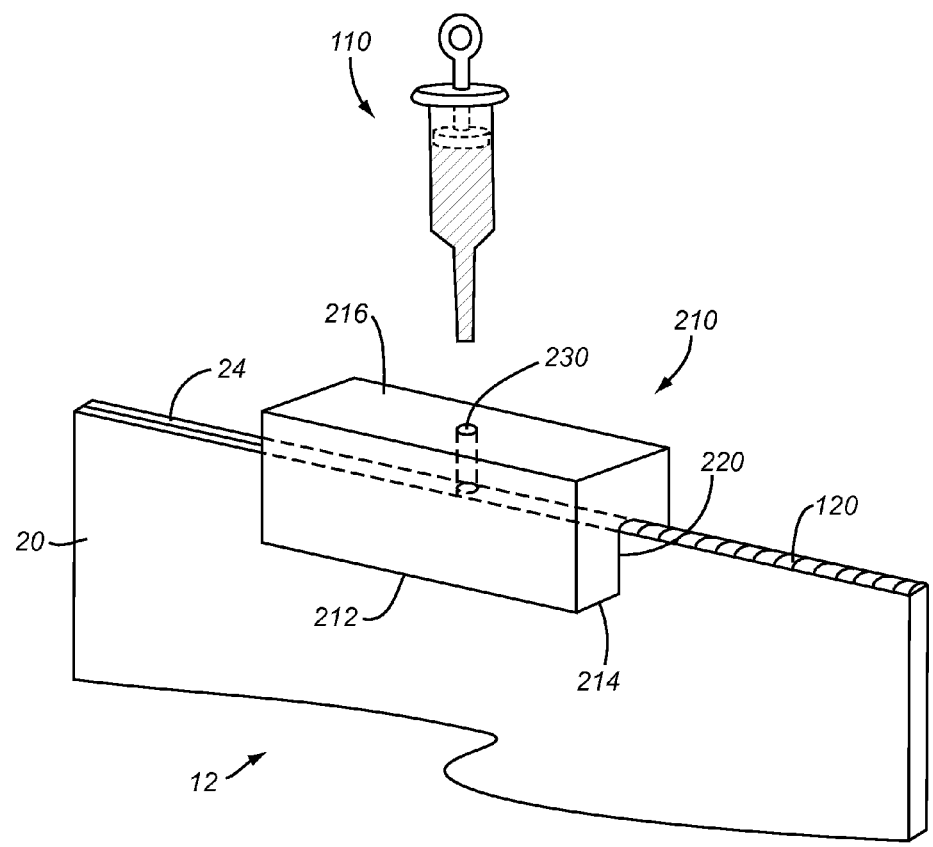
FIGS. 6A and 6B are perspective and side views, respectively, of a fixture for delivering sealant into and/or otherwise along an exposed edge of a target portion of a display being resized.
Figure 6B:
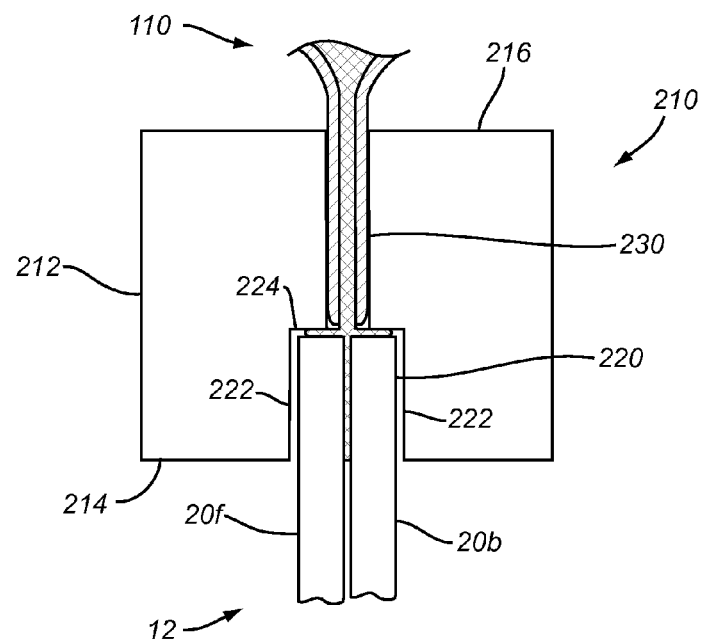

As shown, the fixture 210 is an elongated block or body 212 including a slot 220 within a lower surface 214 of the body 212, and a passage 230 extending from an upper surface 216 of the body 212 into the slot 220. The slot 220 may define sidewalls 222 that extend substantially parallel to one another from the lower surface 214 to a slot base surface 224. The width of the slot 220 may correspond to the outer width of the plates 20, e.g., providing sufficient clearance such that the exposed edges 24 of the plates 20 may be received within the slot 220, e.g., as shown in FIGS. 6A and 6B.

For example, the spacing of the sidewalls 222 may be such that the fixture 210 may be placed over the exposed edge 24 of the plates 20 and directed along the length of the exposed edge 24 with minimal lateral movement. As shown in FIG. 6A, the fixture 210 has been used to deliver sealant 120 from the right end of the exposed edge 24 partially towards the left end of the target portion 12.

Optionally, one or more seals (not shown) may be provided within the slot 220, e.g., to seal the plates 20 within the slot 220 and/or otherwise enhance injection of the sealant into the region between the plates 20. For example, a pair of seals (not shown) may be provided on or in the sidewalls 222 opposite one another adjacent the base surface 224, which may prevent sealant from leaking onto the outer surfaces of the plates 20. In addition or alternatively, one or more seals may be provided around the outlet of the passage 230, e.g., within or on the base surface 224 and/or sidewalls 222 (also not shown), to provide a seal against the exposed edge 24 of the plates 20. Thus, sealant 120 delivered from the dispenser 110 may be delivered onto the exposed edge 24 of the plates 20 and/or injected at least partially into the region between the plates 20, e.g., shown in FIG. 5.

Figure 5:
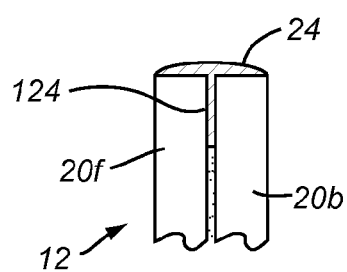
FIG. 5 shows a cross-section of the display of FIG. 4, showing the seal directed between the plates and bonded to the inner surfaces of the plates (as well as lying along the outer cut edges of the plates).

Optionally, the penetration may be facilitated by pulling apart the plates 20 of the target portion 12 a relatively small amount, e.g., using suction cups (not shown) or other vacuum, mechanical force, and the like, applied to the exterior surfaces of the plates 20. In addition or alternatively, if desired, a roller or other tool, e.g., similar to the roller of FIG. 4, may be used to enhance penetration of the sealant 120 into the region between the plates 20 and/or to press the sealant 120 against the exposed edge 24 of the plates. For example, as shown in FIG. 5, the resultant injected sealant may include sealant 124 injected in between the plates 20 and, optionally, sealant applied to the exposed edge 24 of the plates.

Optionally, a detectable trace material, e.g., a phosphorescent or fluorescent material, may be provided in the sealant 120 to facilitate monitoring application of the sealant 120. For example, an appropriate light source may be placed adjacent the exposed edge 24 to illuminate the trace material. The depth of penetration of the sealant 124 between the plates 20 may then be monitored based on observation of the trace material through the target portion 12. If after one or more applications, a desired depth of penetration is not obtained, additional sealant may be applied and/or injected using similar processes to those described above until a desired depth of penetration is achieved.

Figure 2B:
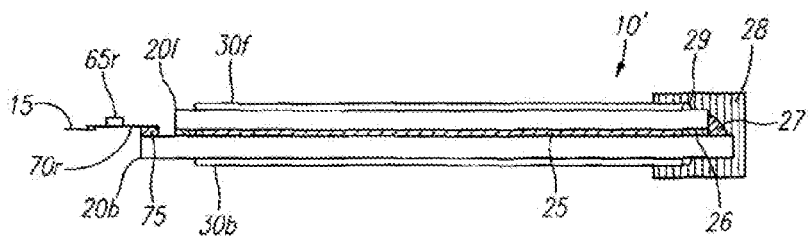
FIG. 2B is a cross-sectional view of the resized display of FIG. 2A, taken along line 2B-2B, with the column TABs removed from the cross-section for purposes of clarity.

The sealant 122, 124 may then be cured, e.g., using appropriate methods to complete resizing the customized display, such as the display 10' shown in FIGS. 2A and 2B. If any excess sealant has leaked onto the outer surfaces of the plates 20, the surfaces may be wiped or otherwise cleaned before the sealant is cured. For example, for a UV-curable adhesive, the target portion 12 may be exposed to ultraviolet light for sufficient time to substantially cure the adhesive between the plates, e.g., for at least about thirty seconds to two minutes depending upon the intensity of the UV and the sensitivity of the adhesive. Alternatively, other adhesives or sealants may be utilized that are cured using heat and/or pressure.

Optionally, the display 10' may be outgassed either before or after curing the sealant. Exemplary apparatus and methods for applying a seal to the exposed edge 16 and/or for outgassing the display 10' are disclosed in U.S. Pat. No. 7,780,492, which is expressly incorporated by reference herein. If desired, any excess sealant disposed along the exposed edge 24 or on the outer surfaces of the plates 20 may be removed, e.g., wiped away before the sealant is cured, or cut, scraped away, or otherwise removed, e.g., using chemicals or mechanical devices, after the sealant is cured.

After curing, the customized display 10' may be cleaned as necessary and/or tested. Optionally, another portion (or portions) of the customized display 10' may be cut and sealed using similar methods to further customize the display 10.' If desired, one or more additional seals may be added to the customized display 10,' along the now-sealed exposed edge 24 and/or along one or more of the additional edges. For example, as shown in FIG. 2B, a second seal 27 may be added, as desired, and then outgassed and/or cured as necessary. The second seal 27 may be a silicone or other material, e.g., applied to minimize the penetration of humidity and/or other contaminants into the liquid crystal material inside the cell, e.g., when the display 10' subjected to its operating environment. Optionally, the second seal 27 may have black ink, dye, and/or other pigment added thereto to produce a substantially black or other opaque color, and may be applied up to the outer perimeter of the target display image area 40', to prevent back light from passing through the display 10' around the outer edges of the target display image area 40.'

In addition or alternatively, also as shown in FIG. 2B, an optional mask or third seal 28 may be added to the newly-exposed plate edges, e.g., over the seal 27, and/or applied up to the outer perimeter of the target display image area 40.' The mask 28 is shown partially broken away in FIG. 2A. It should be dark, e.g., black, and may be tape, ink, sealant, adhesive, plastic, and/or any other suitable material. At least one of the second seal 27, or the optional mask 28 may be used to replace any of the original mask (not shown) removed during the customization process. Additionally, the mask 28 may be placed around the entire perimeter of the cell, e.g., substantially overlying the original perimeter seal 25 and original mask. The third seal or mask may cover part of the active area of the customized display 10' that is not used or desired to be seen be the user in the final implementation. Methods for applying such second and/or third seals 27, 28 are described in the references incorporated by reference elsewhere herein.

Figure 7:
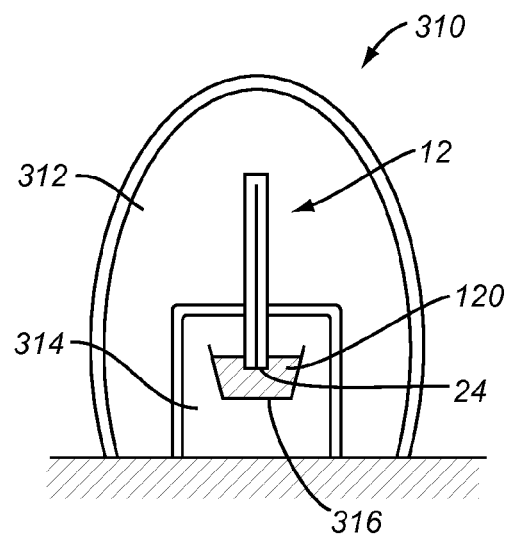
FIG. 7 shows a cross-section of an exemplary embodiment of a pressure fixture including two chambers, which may be controlled to maintain different pressures to inject sealant between the plates of a newly-cut edge of a target portion.

Turning to FIG. 7, in another embodiment, sealant 120 may be injected into the region between the plates 20 along a cut edge 24 in parallel using a pressure fixture 310 with two chambers 312, 314. Most of the plates 20 of the target portion 12 may be held in a first chamber 312 and the cut edge 24 and sealant 120, e.g., in a trough 316, may be held in a second sealant chamber 314. The sealant chamber 314 may be pressurized to a pressure higher than the portion of the plates 20 in the first chamber 312 with the entire length of the cut edge 24 of the target portion 12 immersed in the trough of sealant 316.

As the pressure in the sealant chamber 314 is increased above the pressure in the first chamber 312, the sealant 120 may be injected into the region between the plates 20 along the cut edge 24, similar to the penetration shown in FIG. 5. For example, the pressure within the sealant chamber 314 may be greater than the pressure within the region between the plates 20, thereby injecting the sealant between the plates along the cut edge 24. In addition or alternatively, as the pressure differential increases, the plates 20 may be pulled slightly apart from one another, thereby slightly increasing the cell gap, with the increased volume forcing the sealant 120 into the region between the plates.

Figure 8:
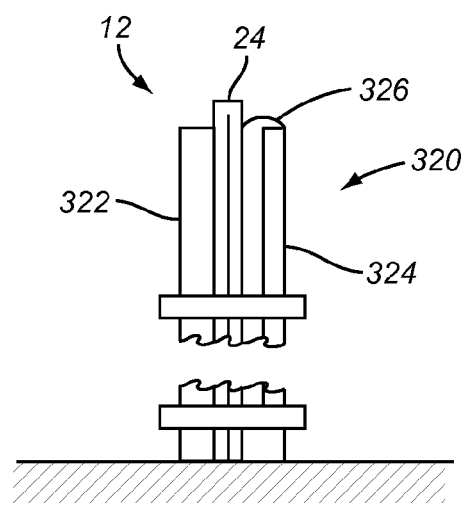
FIG. 8 shows an exemplary embodiment of a pressure-plate fixture that may be used to hold the target display in a position suitable for allow application of sealant and to control cell gap.

Optionally, the cell gap of the plates 20 may be controlled by a restraining mechanism, such as that shown in FIG. 8. Stabilization and control of the gap separation of the plates 20 of the target portion 12 may be completed simultaneously during or after the injection of the sealant 120. After the size of the cell gap is assured to be within desired dimensions and/or tolerances, the sealant 120 is cured, as described elsewhere herein.

For example, to accommodate injection of the sealant, the target portion 12 may be held in a pressure-plate fixture 320, e.g., as shown in FIG. 8 and/or described in the references incorporated by reference elsewhere herein. The pressure-plate fixture 320 may include a pair of plates 322, 324, one with an expandable bladder 326 designed to press the plates 20 of the target portion 12 together. The plates 20 may be pressed together by delivering fluid, such as air, into the bladder 326 in order to eject image-generating medium from between the plates 20 along the cut edge 24. Then, the pressure within the bladder 326 may be returned to a level that will hold the plates 20 sufficiently together to maintain a desired cell gap spacing. If desired, the pressure-plate fixture 320 may hold the plates 20 in a vertical position, e.g., as shown in FIG. 8, to accommodate application of sealant (not shown) and/or subsequent injection force, e.g., using the apparatus and methods described elsewhere herein. The pressure within the bladder 326 may be reduced on the plates 20, thereby allowing the plates 20 to expand and draw the sealant in between the plates before, during, or after the injection of the sealant. As the sealant is drawn or injected between the plates 20, the sealant may push the image generating medium out of the way and wet and bond to the interior surfaces of the plates 20 and/or fill a desired portion of the region between the plates 20 along the cut edge 24 with sealant, thus sealing the cut edge 24. The pressure-plate fixture pressure 320 may be adjusted to cause the gap to be of the proper size.

After the sealant is in place and the gap is at the correct value, the sealant may be cured, e.g., as described elsewhere herein and in the references incorporated by reference elsewhere herein.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

I claim:

1. A method for changing the physical size and/or shape of an electronic display, wherein the display comprises a front plate, a back plate, and a perimeter seal, and wherein an image-generating medium is sealed in a region between the plates, and wherein electronic circuits are distributed throughout an original image area of the display, the method comprising:

cutting the display along desired dimensions resulting in a target display portion and an excess display portion thereby breaking the perimeter seal of the display and creating an exposed edge;

applying sealant along the exposed edge; and rolling a roller along the exposed edge to force sealant into the region between the plates adjacent the exposed edge.

2. The method of claim 1, further comprising:

applying additional sealant along the exposed edge after rolling the roller along the exposed edge; and rolling the roller along the exposed edge to force additional sealant into the region between the plates adjacent the exposed edge.

3. The method of claim 1, further comprising curing the sealant to create a first seal creating a barrier to prevent the image-generating medium from escaping out of the area between the plates.

4. The method as in claim 1, wherein applying the sealant comprises placing a bead of sealant along the exposed edge.

5. The method of claim 4, wherein the bead of sealant partially penetrates into the region between the plates adjacent the exposed edge before the roller is applied.

6. The method as in claim 1, wherein the target display portion is held in a fixture to accommodate the application of the sealant.

7. The method as in claim 6, where the fixture is a pressure plate configured to manipulate the target display portion to move the image-generating medium and promote the placement of the sealant between the plates.

8. The method of claim 1, wherein a portion of the sealant is forced into the region between the plates adjacent the exposed edge, and another portion of the sealant is pressed against the exposed edge of the plates.

9. The method of claim 1, wherein a trace material is provided in the sealant, and wherein the trace material is monitored after rolling the roller along the exposed edge to identify a depth of penetration of the sealant between the plates.

10. A method for changing the physical size and/or shape of an electronic display, wherein the display comprises a front plate, a back plate, and a perimeter seal, and wherein an image-generating medium is sealed in a region between the plates, and wherein electronic circuits are distributed throughout an original image area of the display, the method comprising:

cutting the display along desired dimensions resulting in a target display portion and an excess display portion thereby breaking the perimeter seal of the display and creating an exposed edge;

applying sealant along the exposed edge such that the sealant penetrates into the region between the plates adjacent the exposed edge; and monitoring trace material within the sealant to identify a depth of penetration of the sealant between the plates.

11. The method of claim 10, wherein the sealant is injected into the region between the plates adjacent the exposed edge.

12. The method of claim 11, wherein monitoring trace material comprises:

determining that the depth of penetration is less than a desired depth of penetration; and applying additional sealant between the plates along the exposed edge to increase the depth of penetration of the sealant.

13. The method of claim 10, wherein the trace material comprises phosphorescent or fluorescent material and wherein monitoring the trace material comprises placing a light source adjacent the exposed edge to illuminate the trace material such that the phosphorescent or fluorescent material is visible to the naked eye.

14. The method of claim 10, wherein applying sealant comprises:

applying a bead of sealant along the exposed edge; and rolling a roller along the exposed edge to force sealant into the region between the plates adjacent the exposed edge.

15. The method of claim 10, wherein monitoring trace material comprises:

determining that the depth of penetration is less than a desired depth of penetration, the method further comprising:

applying additional sealant along the exposed edge;

rolling the roller along the exposed edge to force additional sealant into the region between the plates adjacent the exposed edge; and monitoring the trace material within the sealant to identify the additional depth of penetration of the sealant between the plates.

16. A method for changing the physical size and/or shape of an electronic display, wherein the display comprises a front plate, a back plate, and a perimeter seal, and wherein an image-generating medium is sealed in a region between the plates, and wherein electronic circuits are distributed throughout an original image area of the display, the method comprising:

cutting the display along desired dimensions resulting in a target display portion and an excess display portion thereby breaking the perimeter seal of the display and creating an exposed edge;

applying sealant along the exposed edge such that the sealant penetrates into the region between the plates adjacent the exposed edge; and rolling a roller along the exposed edge to force sealant further into the region between the plates adjacent the exposed edge.

17. The method of claim 16, further comprising:

applying additional sealant along the exposed edge after rolling the roller along the exposed edge; and rolling the roller along the exposed edge to force additional sealant into the region between the plates adjacent the exposed edge.

18. The method as in claim 16, wherein applying the sealant comprises placing a bead of sealant along the exposed edge.

* * * * *